(12) United States Patent
Kawahara et al.

(10) Patent No.: US 6,288,993 B1
(45) Date of Patent: Sep. 11, 2001

(54) COMPUTER-CONTROLLED GAME DEVICE WITH CASSETTE ROM AND CD-ROM

(75) Inventors: Yuzou Kawahara, Osaka; Kenichi Morinaga, Tsuzuki-Gun; Masaru Muraoka, Daito, all of (JP)

(73) Assignee: Sega Corporation, Tokyo (JP)

( * ) Notice: Subject to any disclaimer, the term of this patent is extended or adjusted under 35 U.S.C. 154(b) by 0 days.

(21) Appl. No.: 09/440,614

(22) Filed: Nov. 15, 1999

Related U.S. Application Data

(63) Continuation-in-part of application No. 08/044,582, filed on Apr. 7, 1993, now abandoned.

(30) Foreign Application Priority Data

| Apr. 8, 1992 | (JP) | 4-116996 |
| Apr. 8, 1992 | (JP) | 4-116997 |
| May 21, 1992 | (JP) | 4-154451 |
| May 21, 1992 | (JP) | 4-154452 |
| Nov. 20, 1992 | (JP) | 4-335138 |
| Nov. 20, 1992 | (JP) | 4-335139 |
| Nov. 20, 1992 | (JP) | 4-335142 |

(51) Int. Cl.$^7$ .................................. G11B 33/02
(52) U.S. Cl. .................................. 369/75.1
(58) Field of Search .................. 369/77.1–77.2, 369/75.1–75.2; 360/99.02, 99.06

*Primary Examiner*—Allen T. Cao
(74) *Attorney, Agent, or Firm*—Lackenbach Siegel Marzullo Aronson & Greenspan, P.C.

(57) ABSTRACT

A processing device is provided with a disk loading port and a cassette or cartridge loading port both formed in a substantially common top face or surface of the device so that a CD ROM as well as a cartridge ROM may be loaded from the top. A main circuit board, in which a CPU, data processors and other circuits are assembled, is positioned so as to substantially underlie both the disk and cartridge loading ports and generally arranged in a plane parallel to the common top face. The disk operating unit is formed of two portions, one having a lower surface on which the cartridge unit may be detachably mounted, and the other having an elevated portion in which the disk loading port as well as a disk driving mechanism is installed.

10 Claims, 13 Drawing Sheets

US 6,288,993 B1

COMPUTER-CONTROLLED GAME DEVICE WITH CASSETTE ROM AND CD-ROM

RELATED APPLICATION

This application is a continuation-in-part of Ser. No. 08/044,582 filed on Apr. 7, 1993, now abandoned.

BACKGROUND OF THE INVENTION

This invention relates generally to a computer-controlled processing device and, more particularly, the present invention relates to a computer-controlled game device which operates with multiple external information storage media such as CD-ROM, cassette ROM, IC cards or the like.

A popular information storage medium for supplying a home use game device with computer game software is a semiconductor ROM assembled in a cassette or cartridge type housing. Another type of information storage medium is a CD-ROM that is recently being used popularly for supplying game software.

An example of a conventional processing device or a home use game device, which can be supplied with game or other software by way of both a cassette ROM and a CD-ROM, is shown in FIG. 18. The processing device 1 is comprised of a disk regenerator unit 3 and a cassette ROM regenerator unit 4. Cassette ROM unit 4 may be a conventional home use game device to which a game software program is supplied by way of a semiconductor ROM housed in a cartridge or a cassette 5.

The disk unit 3 has a flat main body portion 3a having a squared flat upper surface and an elevated portion 3b that is provided with a plug connector (not shown) at a side wall facing to the squared flat upper surface. The cassette ROM operating unit 4 has a socket connector 4a provided correspondingly to the plug connector of the elevated portion 3b. The cassette ROM unit 4 may be used independently as a game processing device to which a game software program is supplied from a ROM cassette or cartridge 5 mounted to the cassette port. The cassette operating unit 4 may be mounted on the flat surface of the main body portion 3a so that the socket connector of the cassette operating unit 4 is electrically connected with the plug connector of the disk operating unit 3 whereby an application software of music or a game program is supplied from a compact disk 2 loaded on a tray 2A of disk operating unit 3.

Another example of a conventional device is shown in FIG. 19. The device 6 comprises a connecting unit 7, a disk unit 8 and a cassette unit 9. Connecting unit 7 is formed with a thin support portion 7d and an elevated portion 7c with a pair of connector sockets 7a and 7b provided at a side wall thereof facing the support portion 7d. Disk unit 8 and Cassette unit 9 may be detachably connectable by locating on the flat surface of thin support portion 7d so as to be electrically connected to the sockets 7a and 7b, respectively, whereby disk unit 8 is electrically connected to cassette ROM unit 9 through sockets 7a and 7b.

The above-mentioned examples have the following shortcomings. In reference to device 1 shown in FIG. 18, a cassette ROM unit 4 is installed on the flat main body portion 3a and electrically connected with connecting portion 3b of disk unit 3, both units are connected together firmly. The mechanism for loading the compact disk becomes complex because of the tray-loading which requires a tray for loading disks, a tray guide and a tray-driving motor, which results in increasing costs because of an increase in the number of parts and assembly steps.

In reference to device 6 shown in FIG. 19, as the device is composed of three separate units as a whole, each being provided as an independent unit, which also causes an increase of costs. Furthermore, as the device has many connecting portions, it has a tendency to result in bad electrical connections and cause malfunctions.

SUMMARY OF THE INVENTION

It is an object of this invention to provide an improved computer-controlled processing device with multiple information media loading ports.

According to one aspect of this invention a processing device is provided with a disk loading port and a cassette or cartridge loading port both formed on a top face of the device so that a CD-ROM as well as a ROM cassette is loaded from the top, which can decrease number of parts and assembling steps.

According to another aspect of this invention both of the disk loading port and the cassette loading port are formed at a common top face of the processing device, and a main circuit board, on which a CPU, data processors and other circuits are assembled, is disposed so as to underlie both of the disk loading port and the cassette loading port, which can decrease space required for installing and assembling of the processing device.

According to a further aspect of this invention a disk operating unit is formed so that a cassette operating unit, which may be a conventional home use game device, is detachably connectable to the disk operating unit. The disk operating unit is formed with two portions, one having a lower surface on which the cassette unit is detachably mounted, and the other having an elevated portion in which the disk loading port as well as disk driving mechanism is installed.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

Embodiments according to this invention are described in detail with reference to the drawings.

Shown in FIG. 1 to FIG. 7, a computer-controlled processing device 21 is comprised of a CD-ROM regenerator or a CD-ROM operating unit 23 and a cassette ROM operating unit 25.

Figure 3:
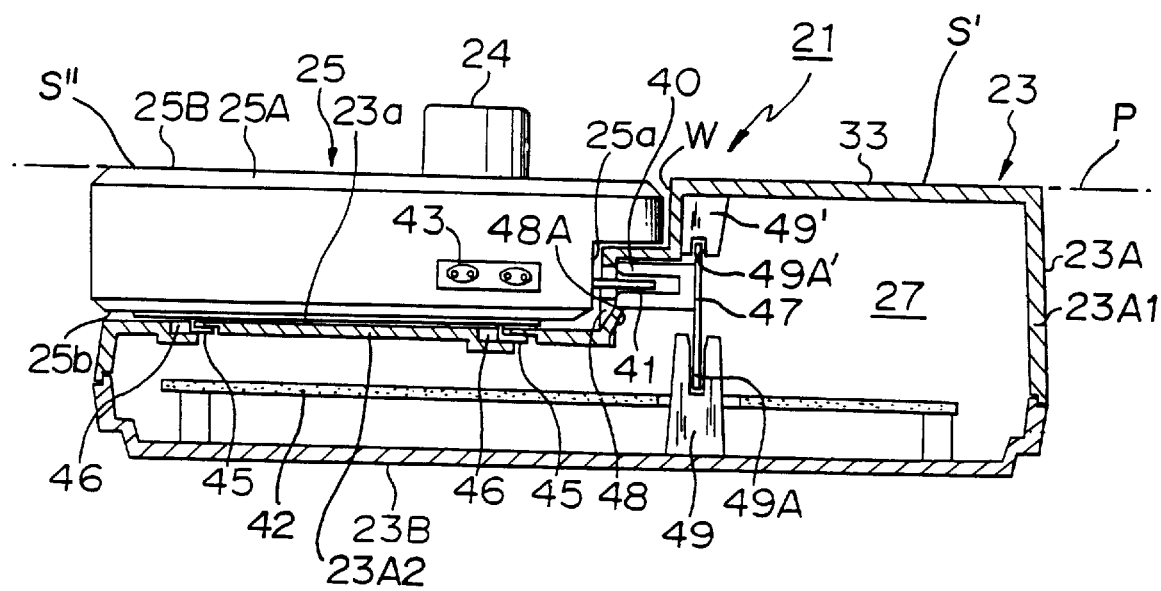
FIG. 3 is a partially sectioned side view of the computer-controlled processing device shown in FIG. 1.
Figure 4:
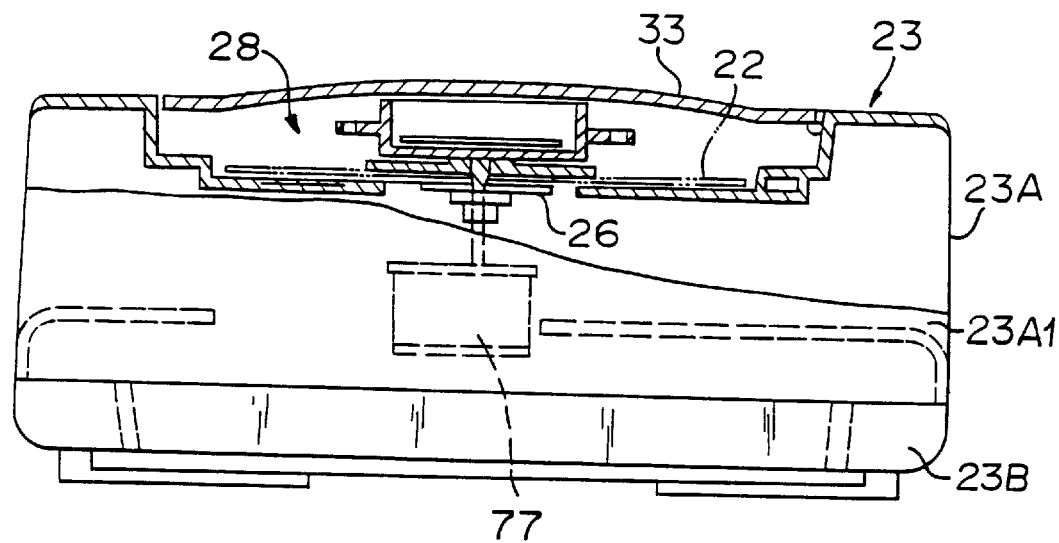
FIG. 4 is a sectional view of the disk operating unit of the computer-controlled processing device shown in FIG. 1.

The cassette ROM operating unit 25 is a home use video game device to which a game software program is supplied from a semiconductor ROM 24 housed in a cassette or cartridge or in an IC card which is detachably mounted to a loading port 44 of the unit 25. An operator (a game player) can enjoy a video game by manipulating a switching controller connected to a peripheral connector 43 (as shown in FIG. 3) of the main body 25A.

The disk regenerator unit 23 is comprised with an upper housing member 23A and a lower housing member 23B. The lower housing 23B is installed with a system controller including a main circuit board 42 extending horizontally along the bottom of the housing 23B. The upper housing member 23A is L-shaped as having a lower portion 23A2 with an upper surface 23a and an elevated portion 23A1 thereby to constitute the L-shaped unit 23. On the upper surface 23a is detachably mounted a cabinet or housing 25B of the cassette ROM operating unit 25.

Figure 1:
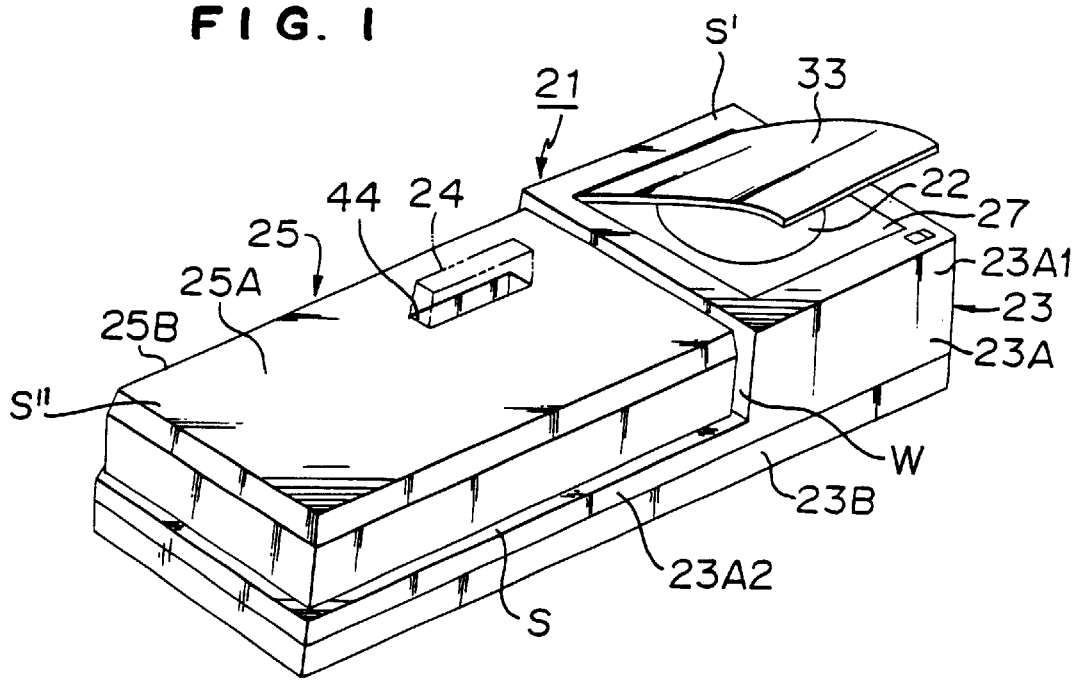
FIG. 1 is a perspective view of the first embodiment of the computer-controlled processing device according to this invention.

On the top face of elevated portion 23A1 is formed a loading port 28 in which are provided therewith a turntable 26 for driving a compact disk 22 loaded thereon and an optical sensor or pick up 78 (shown in FIG. 16) for reading information from the compact disk 22. As shown in FIG. 1 and FIG. 3, the elevated portion 23A1 is so formed that its top face at which the disk loading port 28 is provided is made substantially of co-planer or common with the top face of the cassette ROM operating unit 25 at which the cassette ROM loading port 44 is provided. Within the elevated portion 23A1 is installed a disk-driving mechanism 27 including a spindle motor 77 for driving the turntable 26. A covering lid 33 is also provided on the top face of the elevated portion 23A1 so as to enable the port 28 to open and close. Disks are loaded to the disk loading port 28 from the top of the unit 23, which may be called "top loading". With this device 21, accordingly, both cassette ROM's and disks are loaded from top of the device 21, which provides simplified loading mechanisms.

Figure 8:
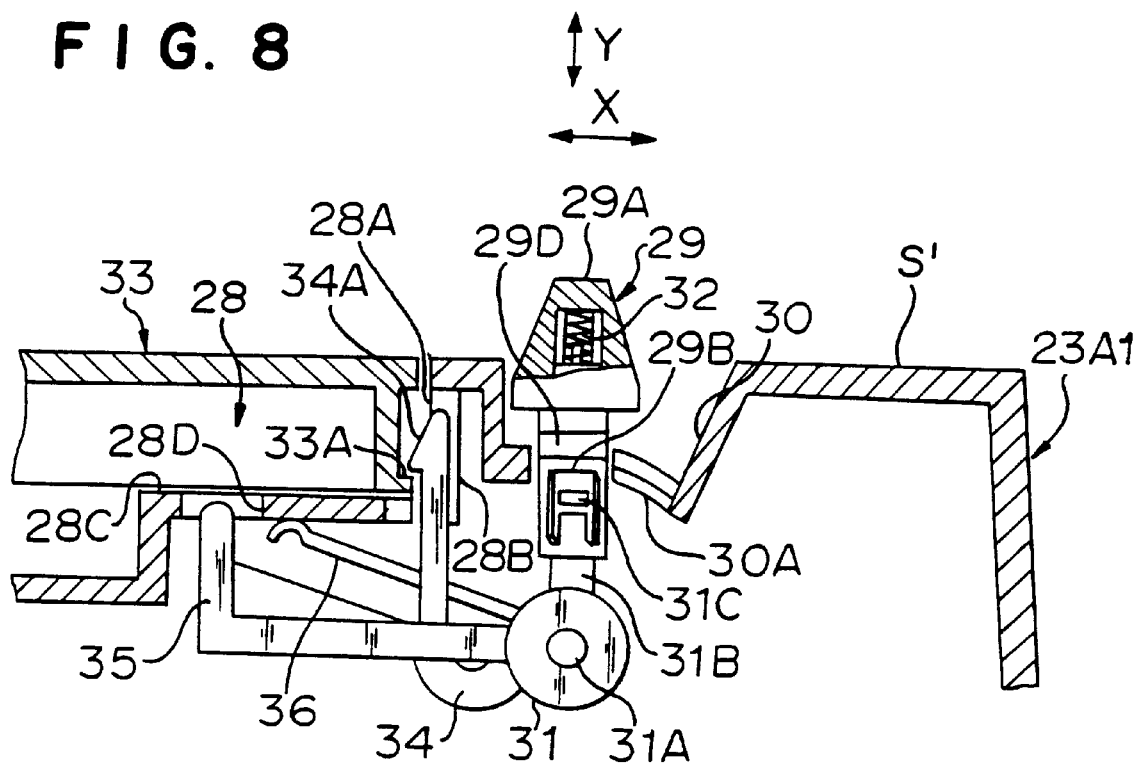
FIG. 8 is a vertically sectioned side view of part of the locking mechanism of the computer-controlled processing device shown in FIG. 1.
Figure 9:
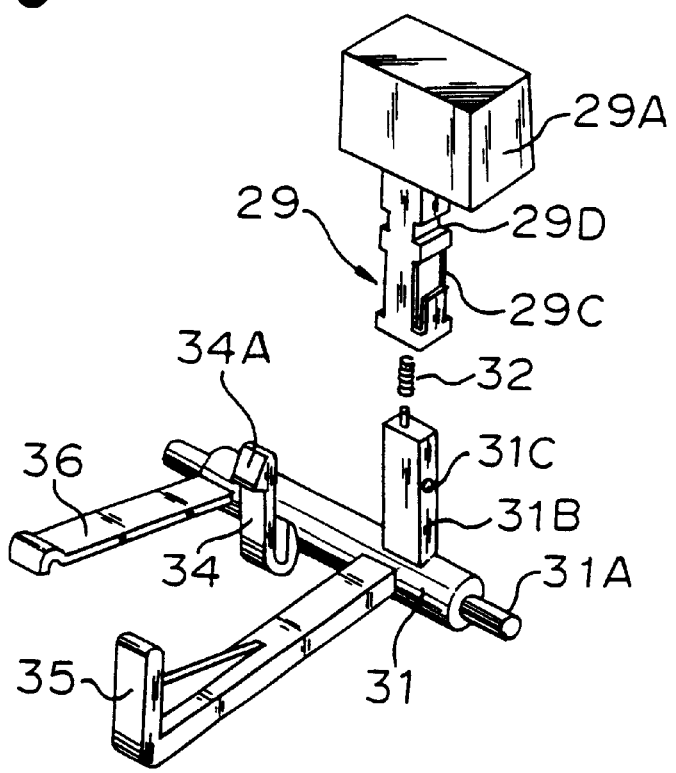
FIG. 9 is a disassembled perspective view of the locking mechanism shown in FIG. 8.

As engaged with the covering lid 33 is installed a locking mechanism as shown in FIG. 8 to FIG. 11. On the top face of the elevated portion 23A1, in parallel to the loading port 28, is shaped a grooved hole 30 for installing a manipulator 29 with a grip 29A as shown in FIG. 8 and FIG. 9. At a lower position beneath the grooved hole 30 in the elevated portion 23A1 is installed a locking member 31 rotatably supported on an axis 31A, and a cylindrical sleeve 29B as part of the manipulator 29 is slidably engaged with an operating rod 31B elongated vertically from the locking member 31. The operating rod 31B is formed with an engaging member 31C which extrudes from the side surface of the rod for preventing the manipulator 29 from disengaging by engaging the member 31C with a window hole 29C formed on the cylindrical sleeve 29B. The member 31C also restricts and controls the movement of the manipulator 29 in the longitudinal direction of the operating rod 31B.

A spring 32 is inserted in the manipulator 29 so as to be supported at its one end on the top portion of the operating rod 31B. Accordingly, it is possible to make the manipulator 29 to move within the range of movement of the engaging member 31C by pushing the grip 29A downwardly against the spring 32. The manipulator 29 is further formed with a guide slit 29D beneath the grip 29A, and a guide rail 30A is formed in the grooved hole 30 correspondingly to the slit 29D and substantially perpendicularly to the moving direction of the grip 29A. The shape of the guide rail 30A is slightly curved so as to move along an arc having its center corresponding to the center of the axis 31A. Owing to this construction, when the manipulator 29 moves in the direction of the guide rail 30A while pushing the grip 29A downward, it is possible rotate the locking member 31 around the axis 31A, as the end portion of the guide rail 30A is not engaged to the guide slit 29D while the grip 29A is pushed down.

A lock lever 34 with a hooked nail 34A is formed integrally with the locking member 31 so that the hooking nail 34A faces against the periphery of the covering lid 33. The hooked nail 34A is positioned in the slit 28B formed around the periphery 28A of the loading port 28 so as to engage with an engaging portion 33A disposed on the periphery of the covering lid 33. In the loading port 28 is formed a stage 28C which engages with the periphery of the covering lid 33 and has a through hole 28D. A pushing rod 35 is integrally formed with the locking member 31 and disposed so that the rod 35 moves up via the hole 28D by the rotation of the locking member around the axis 31A for pushing up the covering lid 33 thereby to open the covering lid 33.

The locking member 31 is also integrally formed with an elastic plate 36 extending toward the stage 28C. For securing the elasticity of the elastic plate 36, the plate 36 as well as the locking member 31 may also be constructed of a plastic material having sufficient elasticity, or the plate 36 itself may be constructed of spring material. With this arrangement, the hooked nail 34A can be engaged with the engaging portion 33A owing to the action of the elastic plate 36 in the locked position.

If the grip 29A is urged to move towards direction X as shown in FIG. 8 the cylindrical sleeve 29B comes in contract with the end portion of the guide rail 30A to prevent the movement of the grip 39A owing to the above-mentioned inter-locking mechanism. Accordingly, even if an operator inadvertently pushes the grip 29A towards direction X, or some mechanical shock occurs, the locking member 31 is not rotated recklessly around the axis 31A. Also, in the same manner, even if the grip 29A is moved in the longitudinal direction of the operating rod 31B (shown as direction Y in FIG. 8), it is able to prevent from unlocking, as the effective operating force does not act on the locking member 31. Accordingly, in order to unlock, it is necessary to press down the grip 29A against the spring 32 to engage the guide slit 29D with the end of the guide rail 30A, and to move the grip 29A in direction X.

With this operation, it is possible to rotate the locking member 31 around the axis 31A to rotate the lock lever 34, and to disengage the hooked nail 34A from the engaging portion 33A. In this case, the extruded rod 35 pushes up the covering lid 33 in a half-opened position. When locking the lid 33 by returning the grip 29A to the original position, the hooked nail 34A engages with the engaging portion 33A by the action of the elastic plate 36 after the covering plate 33 is placed on the loading port 28.

Figure 10:
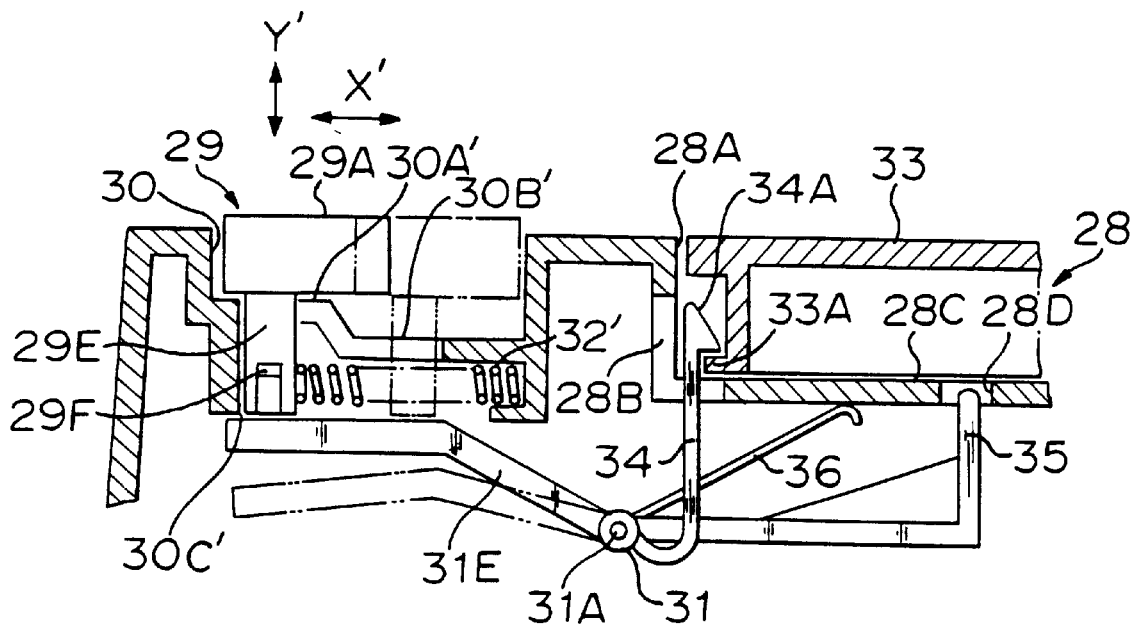
FIG. 10 is a vertical sectional side view of part of another example of the locking mechanism of the computer-controlled processing device shown in FIG. 1.
Figure 11:
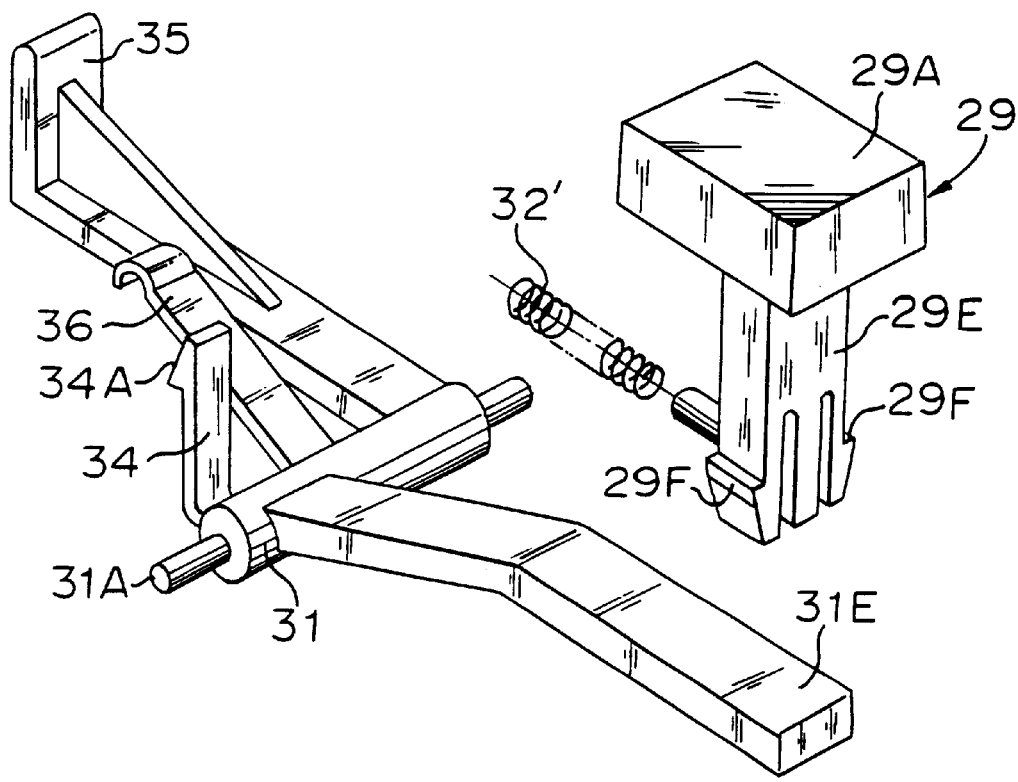
FIG. 11 is a disassembled perspective view of the locking mechanism shown in FIG. 10.

Another variation of the locking mechanism is shown in FIG. 10 and FIG. 11. In this embodiment, the manipulator 29 is disposed independently on the position above the operating lever 31E of the locking member 31 extended towards the side from the axis 31A, and the grip 29A is movably placed in the grooved hole 30 towards direction X' as shown in FIG. 10.

On the bottom of the grooved hole 30 is further formed a slit 30C' extending in the direction X' through which the operational rod 29E of the manipulator 29 extends downwardly so that the end portion of the rod 29E faces against the lever 31E. Engaged with both bottom sides of the slit 30C' a pair of stoppers 29F are formed on both bottom sides of the operating rod 29E in order to prevent the manipulator 29 from disengaging out of the grooved hole 30. A spring 32' is also provide for holding the manipulator 29 as shown in FIG. 10 and FIG. 11.

With the above-described construction, if the grip 29A is pushed towards the direction X' and the manipulator 29 is moved by inadvertent touching or by any accidental mechanical shock, the manipulating rod 29E does not push the manipulating lever 31E of the locking member 31 just by the horizontal movement of the manipulator 29. When the grip 29A is on the upper press-down preventing zone 30A', the locking member 31 does not move as the downward motion of the manipulator 29 in direction Y' is prevented.

With this construction, in order to disengage the covering lid 33 correctly (in FIG. 10 a locked condition is shown), it is required to remove the grip 29A towards the operable zone 30B from the press-down preventing zone 30A', to manipulate the grip 29A to move in direction Y', to push the manipulating lever 31E with the manipulating rod 29E, and to rotate the locking member 31 around the axis 31A.

The locking member 31, locking lever 34, pushing rod 35 and others activate in the same manner as in the embodiment explained herein above.

In each embodiment aforementioned, in order to maintain the covering lid 33 in a fully-opened condition, the quick stop mechanism is installed on the pivotal axis of the covering lid 33.

Figure 12:
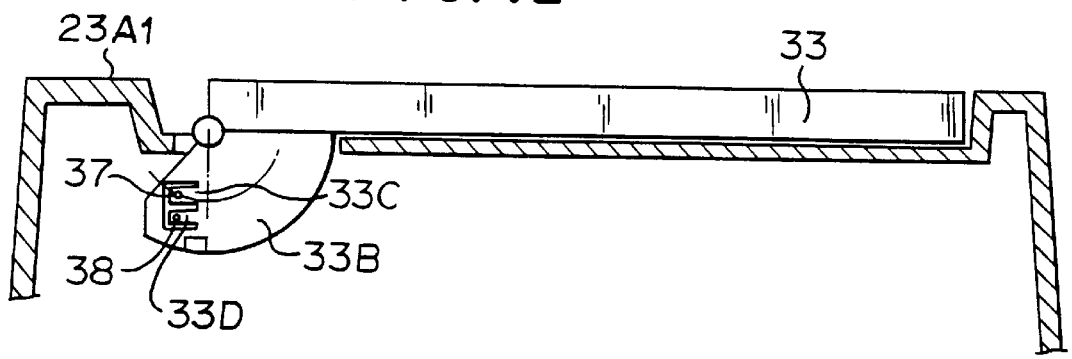
FIG. 12 is a vertical side view of the quick stop mechanism of the computer-controlled processing device shown in FIG. 1.
Figure 13:
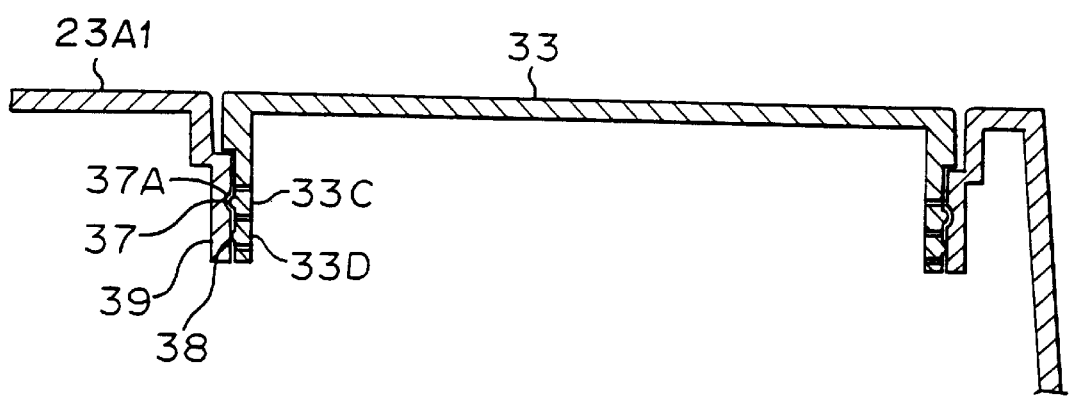
FIG. 13 is a vertically sectioned front view of the quick stop mechanism of the computer-controlled processing device shown in FIG. 1.
Figure 14:
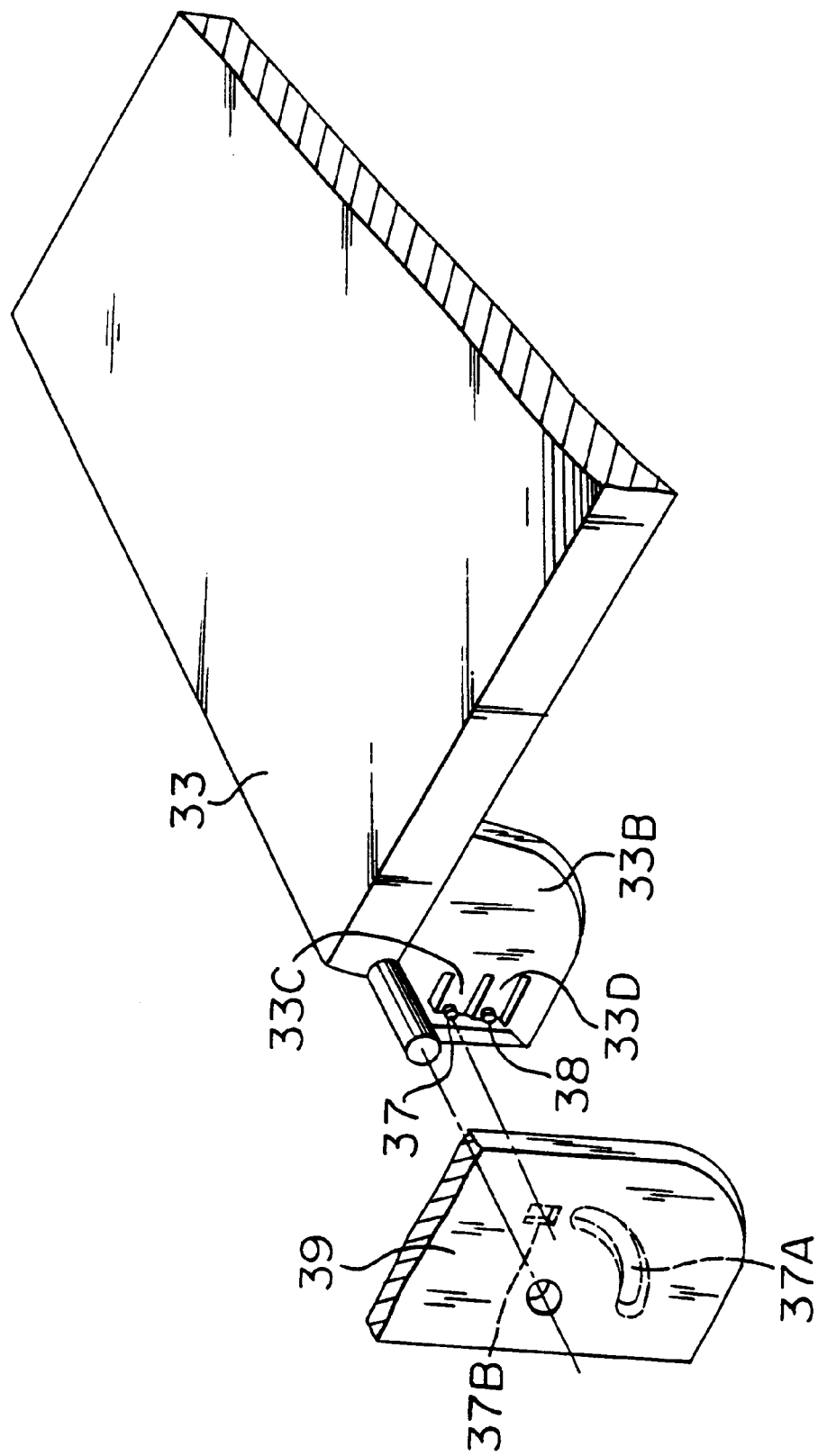
FIG. 14 is a disassembled perspective view of the quick stop mechanism shown in FIG. 12.

As shown in FIG. 12 to FIG. 14, on a pair of fan-shaped brackets 33B fitted on both sides of the covering lid 33 are formed a pair of elastic tongues 33C, 33D with cutting of the brackets 33B, and a plurality of beats or bumps 37 and 38 are formed on the tongues.

On the other hand, a plurality of plate member 39 facing the bracket 33B are formed annexing the housing 23A1, and on each of the plate member 39 are engraved a pair of arc slit 37A and notched groove hole 37B so as to define the center of axis of the cover plate 33 as the center of curvature.

With this construction, the beats 38 come into contact with the corresponding faces of the plate members 39, and slide thereon in contact with the corresponding faces owing to the action of the elastic members 33c, 33D while the covering lid 33 rotates around the rotating axis. Further, the beat 37 slides on the plates 39 with no relation to the movements of the beats 28 in the arc grooves 37A, then elastically enters the notched groove holes 37B. In this condition, the covering plate 33 is maintained in the fully-opened position and doe snot recklessly move towards closing position, owing to the action of the quick-stopping mechanism.

Figure 2:
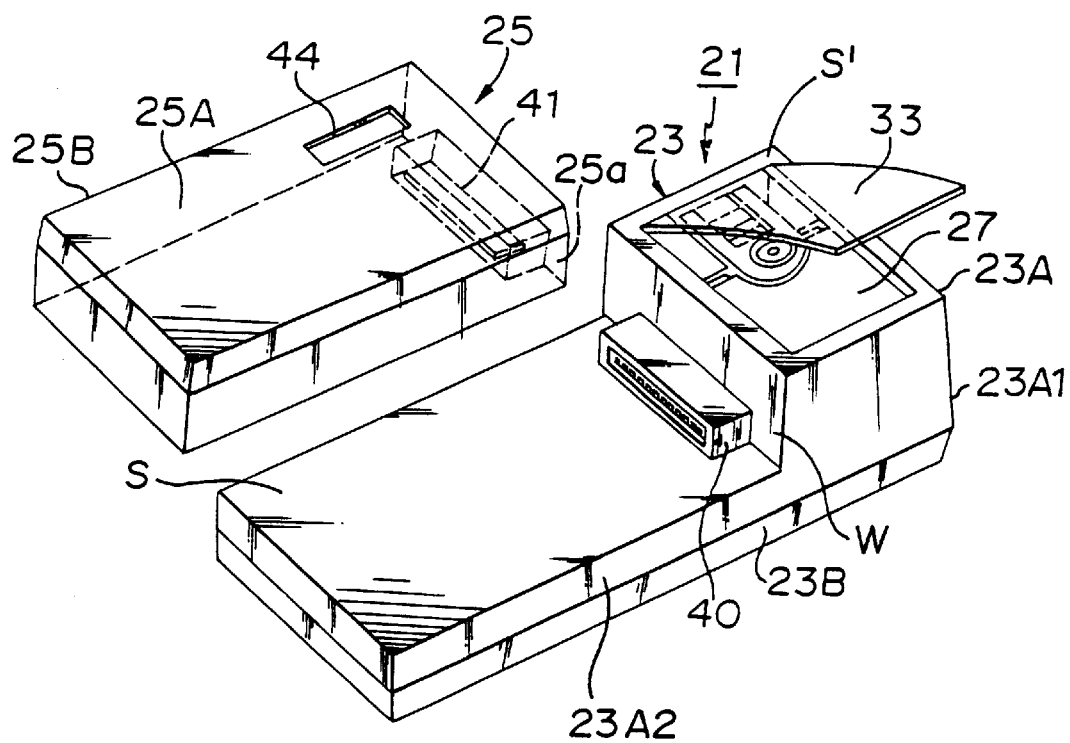
FIG. 2 is a perspective view of the computer-controlled processing device shown in FIG. 1, in which the cassette ROM operating unit is separated from the disk operating unit.

As shown in FIG. 2 and FIG. 3, the side wall 23b of the elevated portion 23A1 is provided with a socket plug 40, and in a depression at the side wall 25a of the cassette ROM unit 25 is provided a plug connector 41 correspondingly to the socket connector 40 so that, when the cassette ROM operating unit is mounted on the upper surface 23a of the disk operating unit 23, the plug connector 41 is inserted into the socket connector 40 thereby to electrically connect the cassette ROM unit 25 with the disk operating unit 23.

Figure 16:
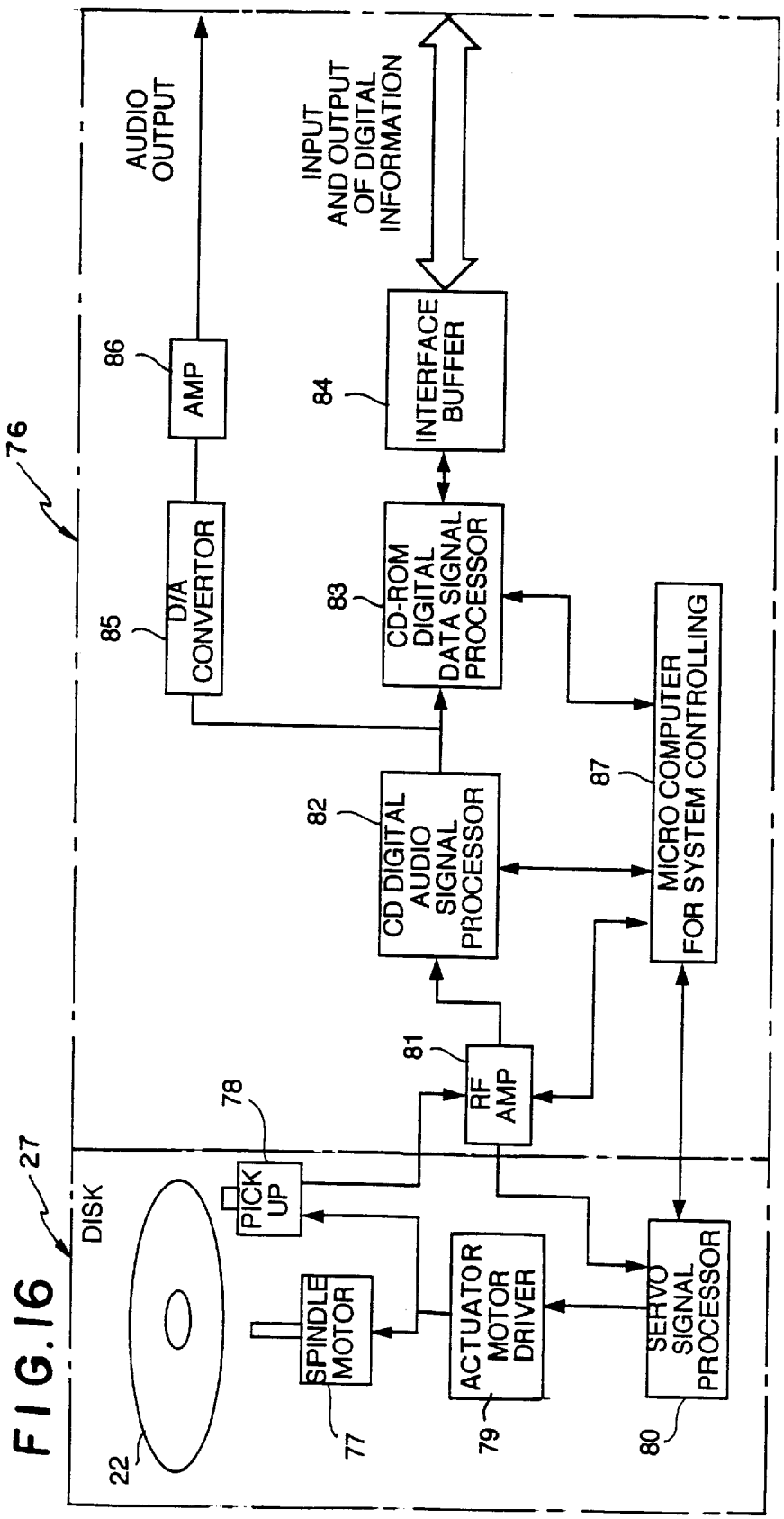
FIG. 16 is a block diagram of the CD-ROM driving mechanism and the system controller of the CD-ROM unit shown in FIG. 1.
Figure 17:
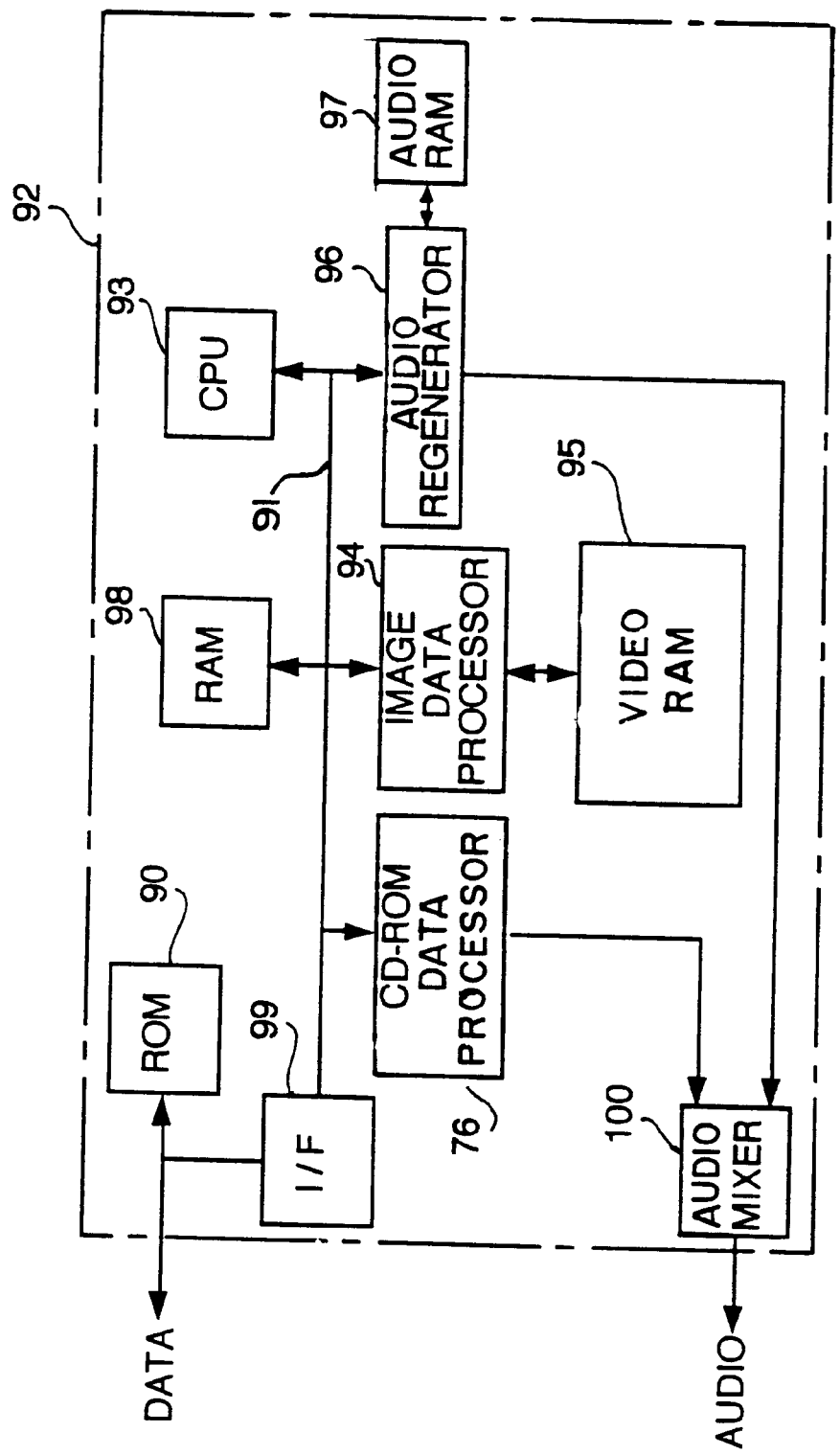
FIG. 17 is a block diagram of another example of the system controller of the CD-ROM operating unit shown in FIG. 16.
Figure 18:
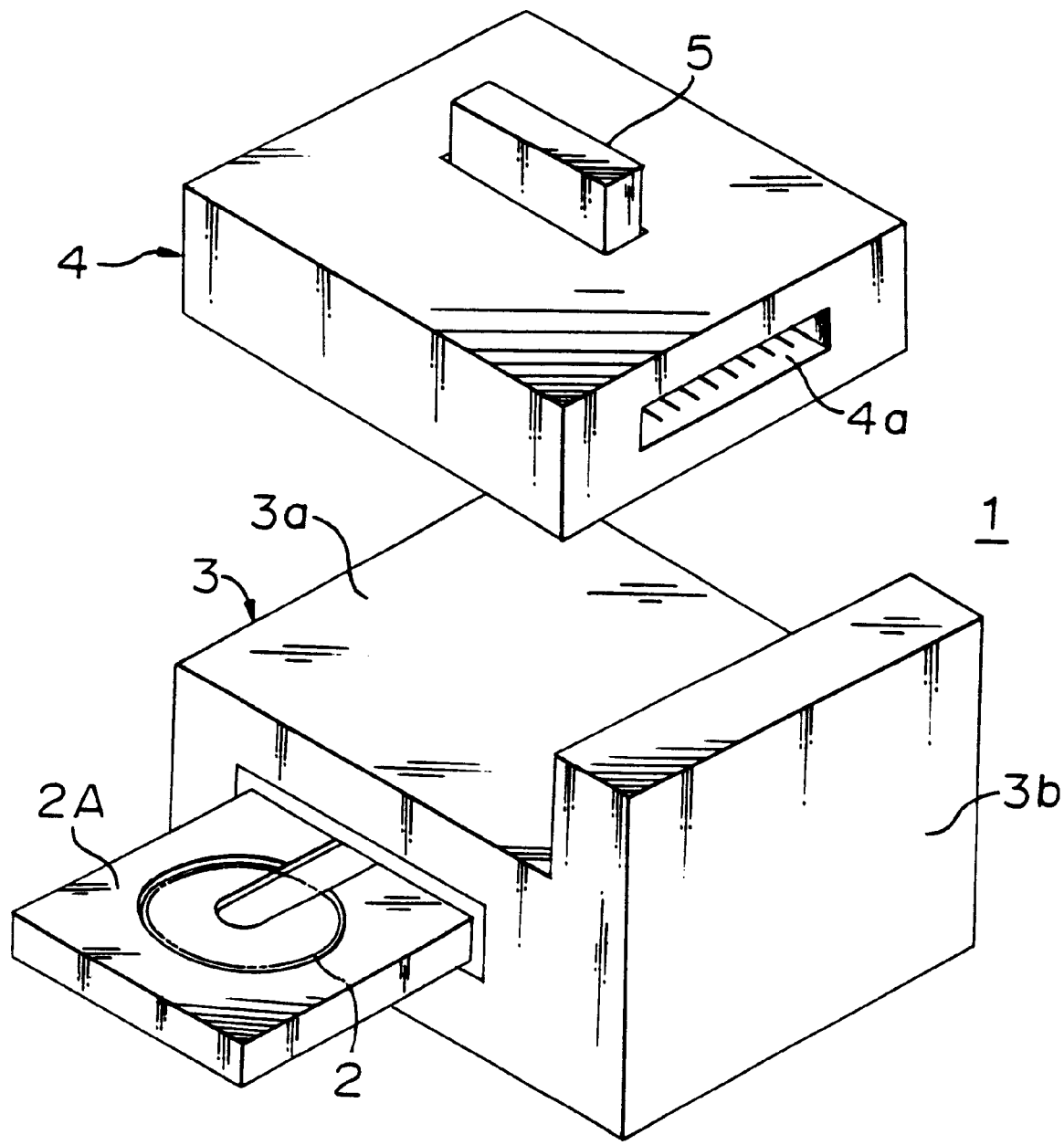
FIG. 18 is a perspective view of a conventional computer-controlled processing device.
Figure 19:
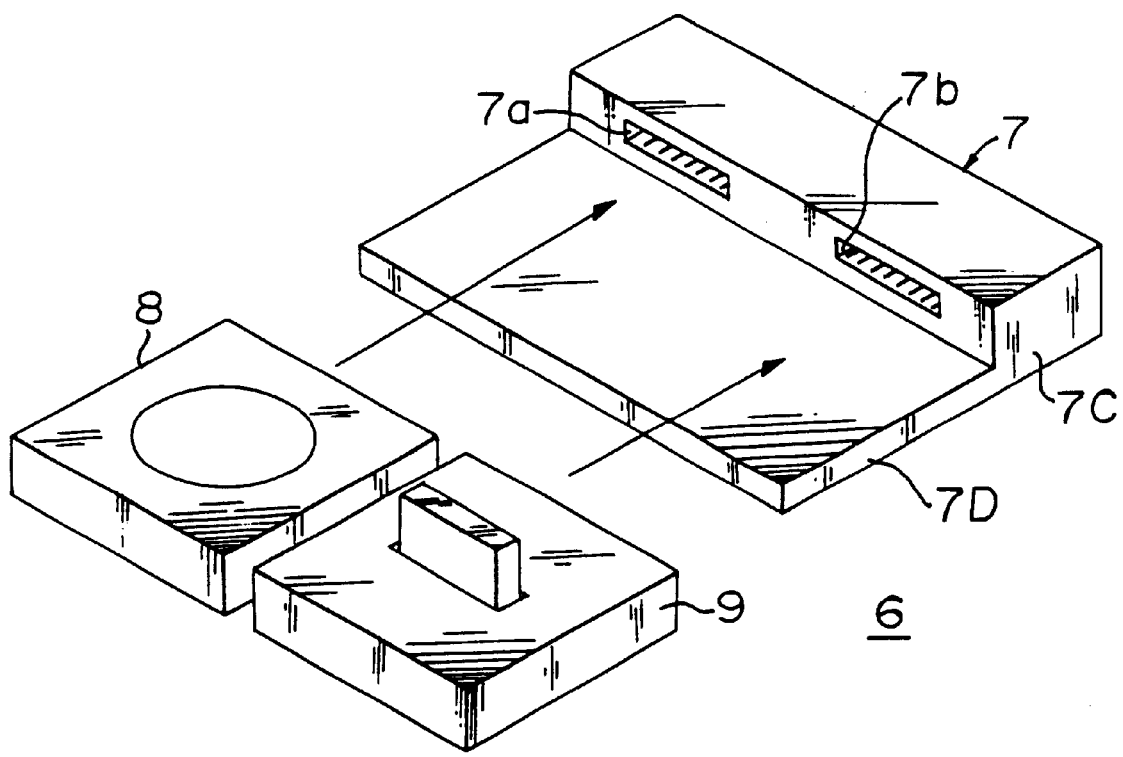
FIG. 19 is a perspective view of another example of a conventional computer-controlled processing device.

As shown in FIG. 3, a main circuit board 42 on which the system controller (as shown in FIG. 16 and FIG. 17) of the CD-ROM regenerator unit 23 is assembled is contained within, and fixed to, the lower housing member 23B of the unit 23 so as to underlie the cassette ROM operating unit 25 and extend to the elevated portion in which the main circuit board 42 also underlies the disk loading port 28 and the disk-driving mechanism 27. The CD-ROM regenerator unit 23 exchanges information data with the cassette ROM unit 25 through the connectors 40 and 41.

The cassette ROM unit 25 has a pair of peripheral port connectors 43, each for connecting a joystick or the like (not shown) which may be used for manipulating progress of a game. A game software program may be supplied from a cassette ROM 24 which is detachably connected to the cassette loading port 44 as shown in FIG. 1 to FIG. 3 and FIG. 15.

The bottom surface 25b of the cassette ROM unit 25 are formed with a four hooks 45 extruded downwardly and shaped like letter L which, when the cassette unit 25 is mounted to the CD-ROM regenerator 23, detachably engage with the corresponding engaging ports 46 formed on the upper surface 23a of the CD-ROM regenerator 23.

The socket connector 40 is secured on a printed circuit board 47 and disposed in a protruding portion with a window 48 formed on the side wall 23b of the elevated portion 23A1 so that the plug connector 41 is inserted into the socket connector 40 through the window 48.

The lower housing 23B is formed with a holding member 49 having a groove 49A shaped so as to receive the lower edge of the printed circuit board 47. The upper housing 23A is formed with a holding member 49' having a groove 49A' facing the groove 49A shaped so as to receive the upper edge of the printed circuit board 47. The position of the connector 40 is secured by holding the upper and the lower edges of the board 47 between the grooves 49A and 49A' when the upper and the lower housings are assembled and mechanically fixed each other with screws.

Figure 6:
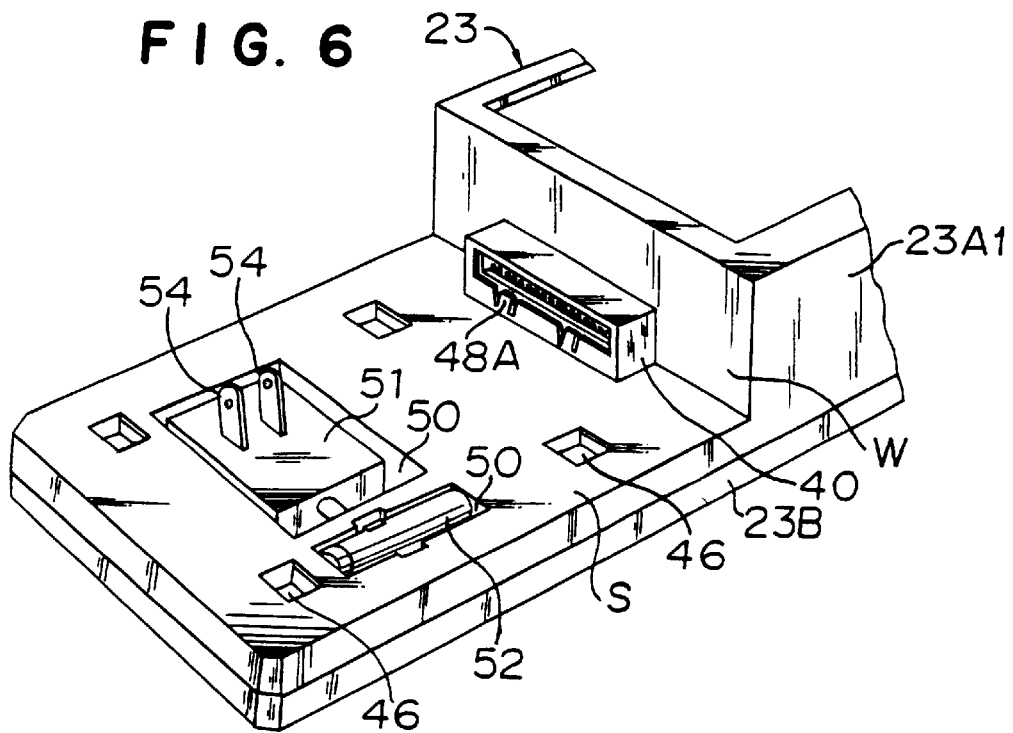
FIG. 6 is a perspective view of another example of the accessory-containing portion of the computer-controlled processing device shown in FIG. 1 dismantled from the cassette ROM operating unit.

As shown in FIG. 6 and FIG. 3, on the lower peripheral of the window 48 are formed elastic nails 48A for supporting elastically and securely the connector 40 in corporation with the holding members 49A and 49A'.

The connector 40 is electrically connected to the main circuit board 42 through conductive layers formed on the printed circuit board 47. The printed circuit board 47 may also be used for installing expanded memories.

Figure 5:
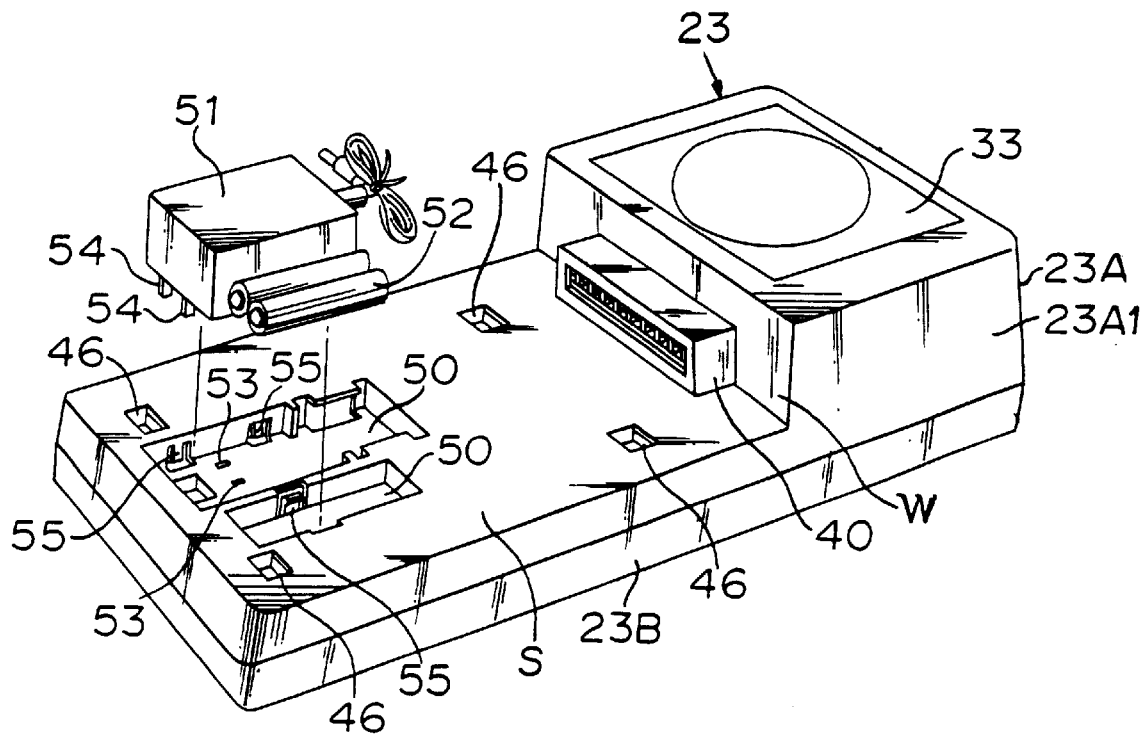
FIG. 5 is a perspective view of the accessory-containing portion of the computer-controlled processing device shown in FIG. 1 dismantled from the cassette ROM operating unit.

As shown in FIG. 5, the upper housing 23A are formed with depressions 50 on the upper surface 23a for storing accessories for the device 21. The depressions 50 are formed with shapes and dimensions so as to receive AC adapter 51 and batteries 52. In one of the depressions 50 are formed grooves 53 for receiving plug terminals 54 of the AC adapter 51. In both of the depressions 50 are also formed hooks 55 for fixing the AC adapter 51 and batteries 52 when they are stored therein.

Another variation for storing accessories is shown in FIG. 6 wherein the AC adapter 51 is stored so that the plug terminals 54 are positioned upwardly and on the bottom surface of the cassette ROM operating unit 25 are provided grooves for receiving the plug terminals 54.

Figure 7:
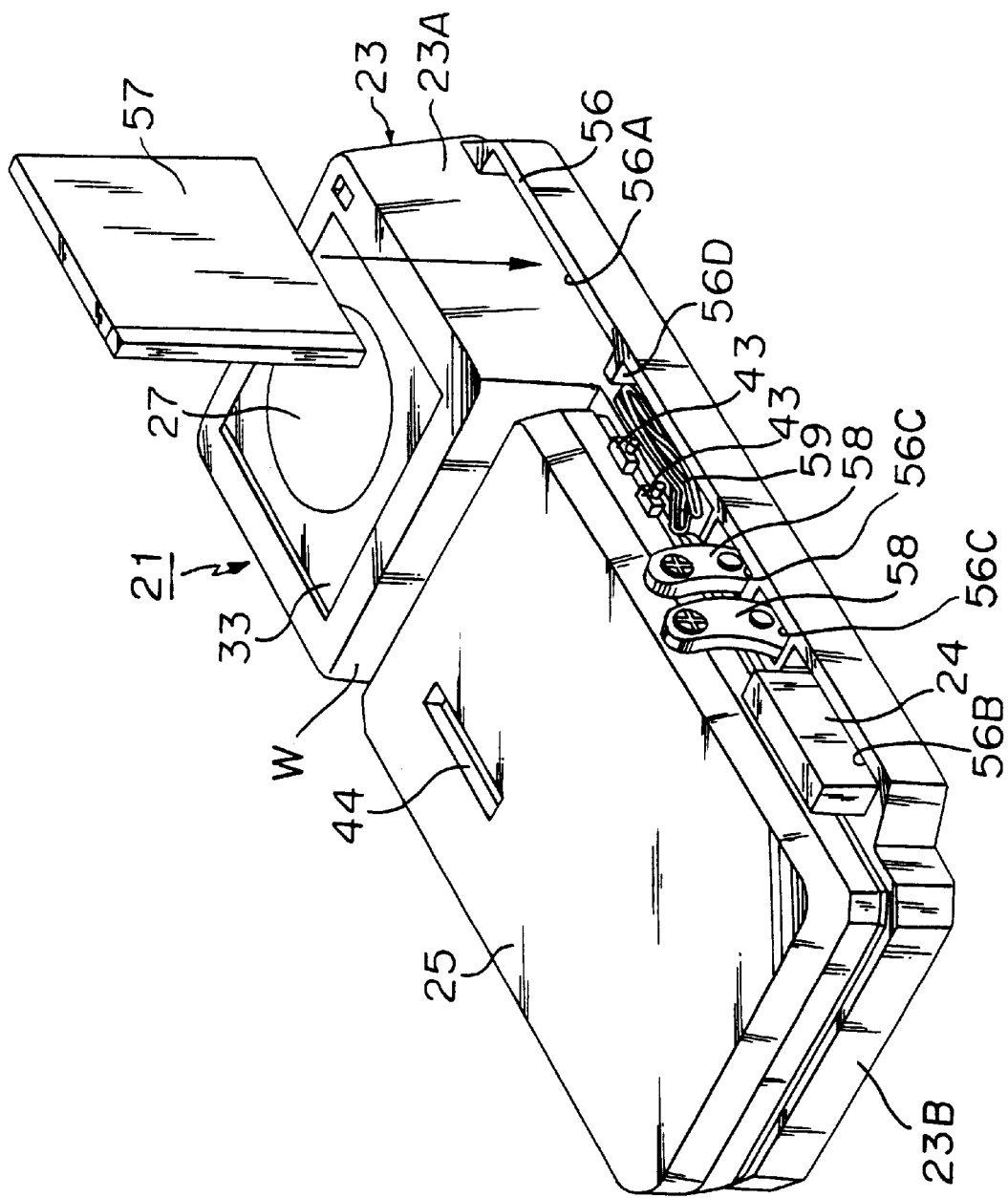
FIG. 7 is a perspective view of a modified example of the computer-controlled processing device shown in FIG. 1, which is provided with pocket portions for storing accessory components.

As shown in FIG. 7, there may be formed a pocket 56 for storing parts and accessories on the front surface of the CD-ROM regenerator 23. The pocket 56 may be partitioned to provide spaces 56A to 56D: 56A for storing a disk case 57, 56B for ROM cassette 24, 56C for joy pads 58, and 56D for joint code 59, respectively.

Figure 15:
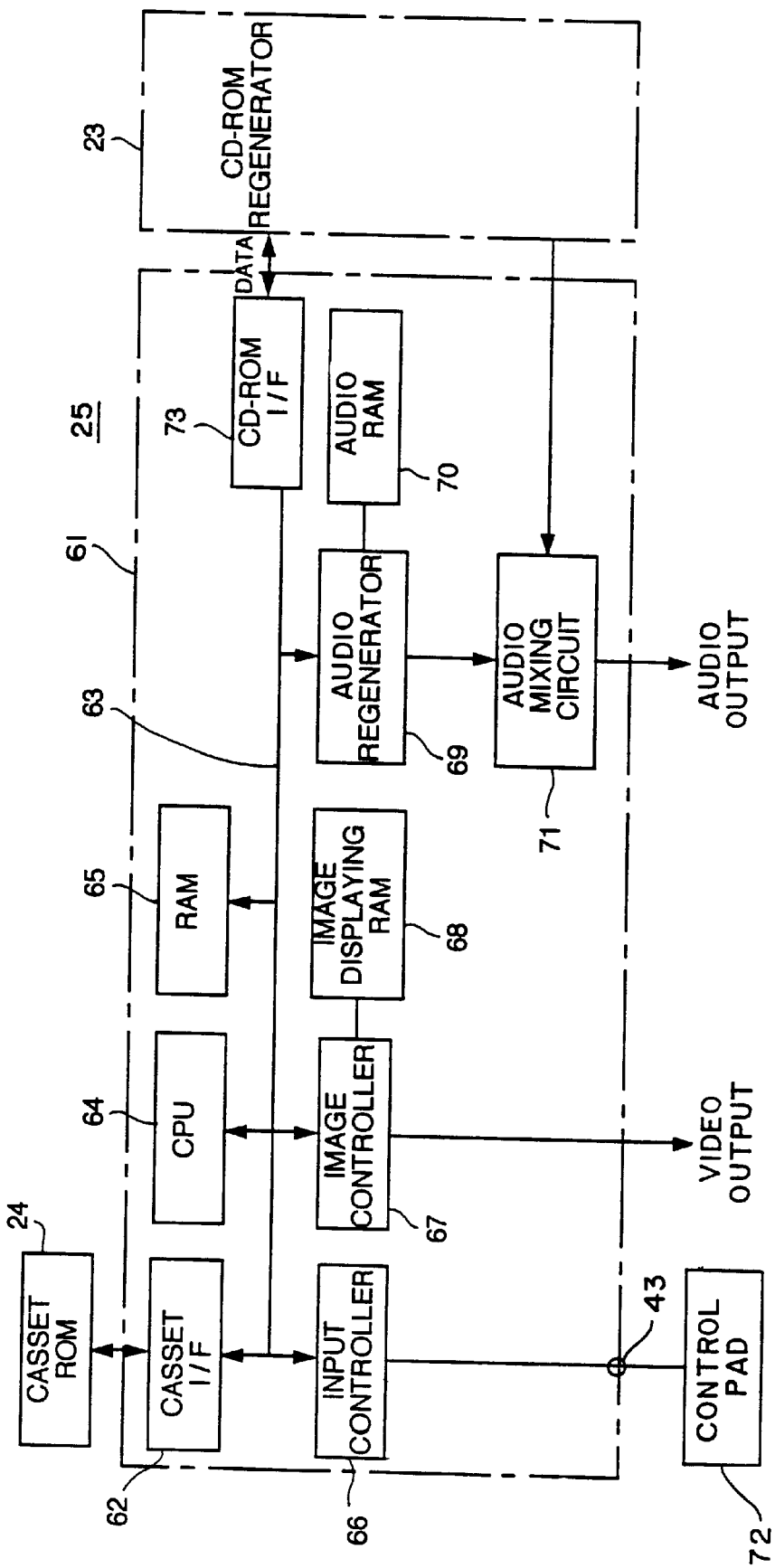
FIG. 15 is a block diagram of the cassette ROM operating unit shown in FIG. 1.

The cassette ROM unit 25 comprises therein a controlling system or a data processing system 61 for controlling operation and processing video and audio signal data for the unit 25, a block diagram of which is shown in FIG. 15. The control systems 61 is provided with an interface (I/F) 62, a CPU 64 connected to system bus 63 for controlling the operation of the unit 25, system RAM 65, input controller 66, image or video controller 67 for processing image data and generating video signals, video RAM 68 connected to the video controller 67 for storing image displaying data, audio regenerator or processor 69 for processing and generating audio signals, and audio RAM 70 connected to audio regenerator 69. The controllers 66, 67 and 69, cassette interface 62 and system RAM are all connected with CPU 64 via system bus 63. A cassette or cartridge ROM 24 is removably connected to the interface 62 whereby a game software program is supplied from a ROM to the data processing system 61. A switching controller 72 (a joystick, a control pad or the like)( is connected to input controller 66 via peripheral connector 43) whereby a game-player can control progress of a game by manipulating switches on the controller 72.

The control system 61 further comprises CD-ROM interface 73 connected to the system bus 63 for exchanging data with CD-ROM generator or CD-ROM operating unit 23, and audio mixer 71 which mixes audio signals from audio regenerator 69 with audio signal conducted from CD-ROM generator 23 for outputting audio signals.

The CPU 64 controls exchange of information and data within the system 61 with a specified clock frequency and outputs monitoring video signals and audio signals and together with controlling exchange of data and audio signal with CD-ROM regenerator 23 when required.

On the other hand, as shown in FIG. 16, the CD-ROM operating unit 23 is provided with the disk driving mechanism 27 and the system controller (data processing system) 76. The disk driving mechanism 27 is comprised of spindle motor 77 for rotating turntable 26 on which a CD-ROM disk 22 is loaded, actuator motor driver 79 which controls rotation of motor 77 and movement of optical pick up 78. Function of actuator motor driver 79 is controlled by servo signal processor 80. The optical pick up or sensor 78 reads data from the CD-ROM disk 22 loaded on the loading port 28 and data read by pick up 78 from the disk 22 is sent to, and processed by, RF amplifier 81. The data from RF amplifier 81 is sent to CD digital audio signal processor 82 and audio data signal is sent to D/A converter 85 and amplifier 86 which sends audio outputs to the unit 25 via connectors 40 and 41. Data signals such as video signals and game programs are transmitted to CD-ROM digital data signal processor 83. Position related data are sent from RF amplifier 81 to servo signal processor 80 for feedback-control of movement of spindle motor 77 and pick up 78. These signal processors operate under controls of microcomputer 87.

Under the direction or control of CPU 64 of the unit 25, the data processing system 76 exchanges data with the data processing system 61 of the unit 25 via interface buffer 84 and also transmit audio outputs to the system 61 of the unit 25 whereby the processing device 21 enables to regenerate software sources supplied from CD and execute software programs such as game programs supplied from CD-ROM disks 22 in addition to software programs supplied from cassette ROM 24.

There is shown in FIG. 17 another embodiment of CD-ROM operating unit 23 in which an enhanced system controller (data processing system) 92 is installed in addition to the CD-ROM control and data processing system 76. The enhanced data processing system 92 is provided with a CPU 93 for controlling operation of the system 92 including the CD-ROM data processor 76, an image or video data processor 94 for processing image data to add, for example, rotational and zooming effects to image data in addition to the image processing by image controller 67 of unit 25, a video RAM 95 connected to image data processor 94, audio regenerator or processor 96 which enhances or adds data processing of audio or sound data in addition to the data processing by audio generator 69 of the unit 25, an audio RAM 97 connected to audio processor 96, a system RAM 98, interface 99, system ROM 90 which stores system control programs to be executed by CPU 93 and including programs for controlling the CD-ROM drive mechanism, and an audio or sound mixer 100. Those processors 94 and 96, system RAM 98, system ROM 90, interface 99 as well as CD-ROM data processing system 76 are connected to CPU 93 via system bus 91. The enhanced data processing system 92 provides enhanced data processing ability and improved quality of processed image and audio performances. Further, the processing device 21 may execute software programs read from the disk 22 without loading the cartridge ROM 24.

The unit 23 with the system controller 92 shown in FIG. 17 may be installed with peripheral connectors 43 similarly as the unit 25 with the system controller 61 thereby to use the CPU 93 for executing game software programs, whereby both the units 23 and 25 can be arranged to be simultaneously as game control systems.

What is claimed is:

1. A game device comprising: a first operating unit having a first top face which generally defines a loading plane, a cartridge loading port formed in said first top face for removably receiving a cartridge through said first top face, said cartridge loading port having a slot formed on said first top face so as to receive the cartridge along a direction oriented substantially normal to said loading plane; a second operating unit having a second top face which is substantially co-planar with said loading plane, a disk loading port formed in said second top face for removably loading a CD-ROM through said second top face, said second operating unit also having a bottom wall substantially parallel to said second top face and an intermediate wall between and substantially parallel to said second top face and said bottom wall, said intermediate wall serving as a support for said first operating unit; a controller having a circuit board spaced from said loading ports so as to underlie said loading ports, said controller including a CPU and image processor means for processing game software data read from at least one of the ROM and the CD-ROM respectively loaded by means of said cartridge loading and disk loading ports; and a connector port through which a manipulating controller is functionally connectable to the game device.

2. A game device comprising: a first operating unit having a first top face which generally defines a loading plane, a cartridge loading port formed in said first top face for removably loading a cartridge storing game software from said first top face, said cartridge loading port having a slot formed on said first top face so as to receive the cartridge along a direction oriented substantially normal to said loading plane; first controller means including a CPU and an image processor for executing the game software, and a connector port to which a manipulating controller is connectable; and a second operating unit having a second top face which is substantially co-planar with said loading plane, a disk loading port formed in said second top face for removably loading a CD-ROM from said second top face, said second operating unit having a bottom wall substantially parallel to said second top face and an intermediate wall between and substantially parallel to said second top face and said bottom wall, said intermediate wall serving as a support for said first operating unit, and a second controller means having a circuit board including a CPU spaced from said loading ports so as to underlie said ports, image processor means and means for exchanging data with said first operating unit and for processing game software data read from at least one of the cartridge ROM and the CD-ROM respectively loaded by means of said cartridge loading and disk loading ports.

3. A game device as defined in claim 2, wherein said second operating unit comprises a generally L-shaped housing having first and second portions having different heights to form an intermediate side wall where said housing portions meet, said first housing portion having the greater height and including said second top face formed with said disk loading port; a first connector formed in said side wall, said second housing portion defining a support surface, said first operating unit being provided with a second connector which is matable with said first connector, when said first operating unit is positioned on said support surface, said circuit board being disposed in said housing so as to extend said first and second portions.

4. A game device comprising: a cartridge loading port formed in a top face of the game device which generally defines a loading plane for removably loading cartridge storing game software from said top face, said cartridge loading port having a slot formed on said top face so as to receive the cartridge along a direction oriented substantially normal to said loading plane; a disk loading port formed in said top face of the game device for removably loading a CD-ROM from said top face; a system controller means having a circuit board extending substantially in parallel with said loading plane and spaced from said loading ports so as to underlie directly beneath said loading ports, said controller means including a CPU and image processor means for processing game software data read from at least one of the ROM of the cartridge type and the CD-ROM respectively loaded by means of said cartridge loading and disk loading ports; and a connector port through which a manipulating controller is functionally connectable to the game device.

5. A game device as defined in claim 4, wherein said connector port is formed on a front face of the game device, said manipulating controller being one of a control pad and a joystick.

6. An electronic device for use with a game device having a cartridge loading port formed in a top face of the game device for removably loading a cartridge storing a game software, said cartridge loading port having a slot formed on said top face so as to receive the cartridge along a direction oriented substantially normal to said loading plane; a controller means including a CPU and an image processor for executing the game software, and a connector port to which a manipulating controller is connectable, said electronic device comprising: a disk loading port formed in said top face so as to have a substantially common plane with said cartridge port for removably loading a CD-ROM storing a game software, said controller means underlying directly beneath at least one of said loading ports and having a CPU, image processor means and means under the control of the CPU of said game device for exchanging data with said game device and for processing game software data read from at least one of the cartridge ROM and the CD-ROM respectively loaded by means of said cartridge loading and disk loading ports.

7. A game device comprising; a top face which generally defines a loading plane; a first port formed in said top face for removably inserting an information storage medium housed in a cartridge, a second port formed in said top face for removable loading a disk type information storage medium, said cartridge loading port having a slot formed on said top face so as to receive the cartridge along a direction oriented substantially normal to said loading plane; a system controller means having a circuit board extending substantially in parallel with said loading plane and spaced from said first and second ports so as to underlie directly beneath said ports, said controller means including a CPU and image processor means for processing a game program read from at least one of said first and second ports; and a connector port to which a manipulating controller is removably connectable to the game device.

8. A game device comprising a housing which, in normal use, defines a first top loading cartridge port for removably inserting an information storage medium housed in a cartridge, and a second top loading port for removably loading a disk type information storage medium, said cartridge loading port having a slot formed on said top face so as to receive the cartridge along a direction oriented substantially normal to said loading plane; a system controller means having a circuit board extending below at least one of said first and second top loading ports and spaced therefrom so as to underlie directly beneath said at least one of said first and second top loading ports, said controller means including a CPU and image processor means for processing a game program read from at least one of said first and second top loading ports; and a connector port on said housing to which a manipulating controller is removably connectable to the game device.

9. A game device as defined in claim 8, wherein said first and second top loading ports include access openings formed in a substantially common top loading plane of said housing.

10. A game device as defined in claim 9, wherein said first and second top loading ports include access openings formed in a common top wall of said housing.

\* \* \* \* \*